United States Patent Office 2,700,741
Patented Jan. 25, 1955

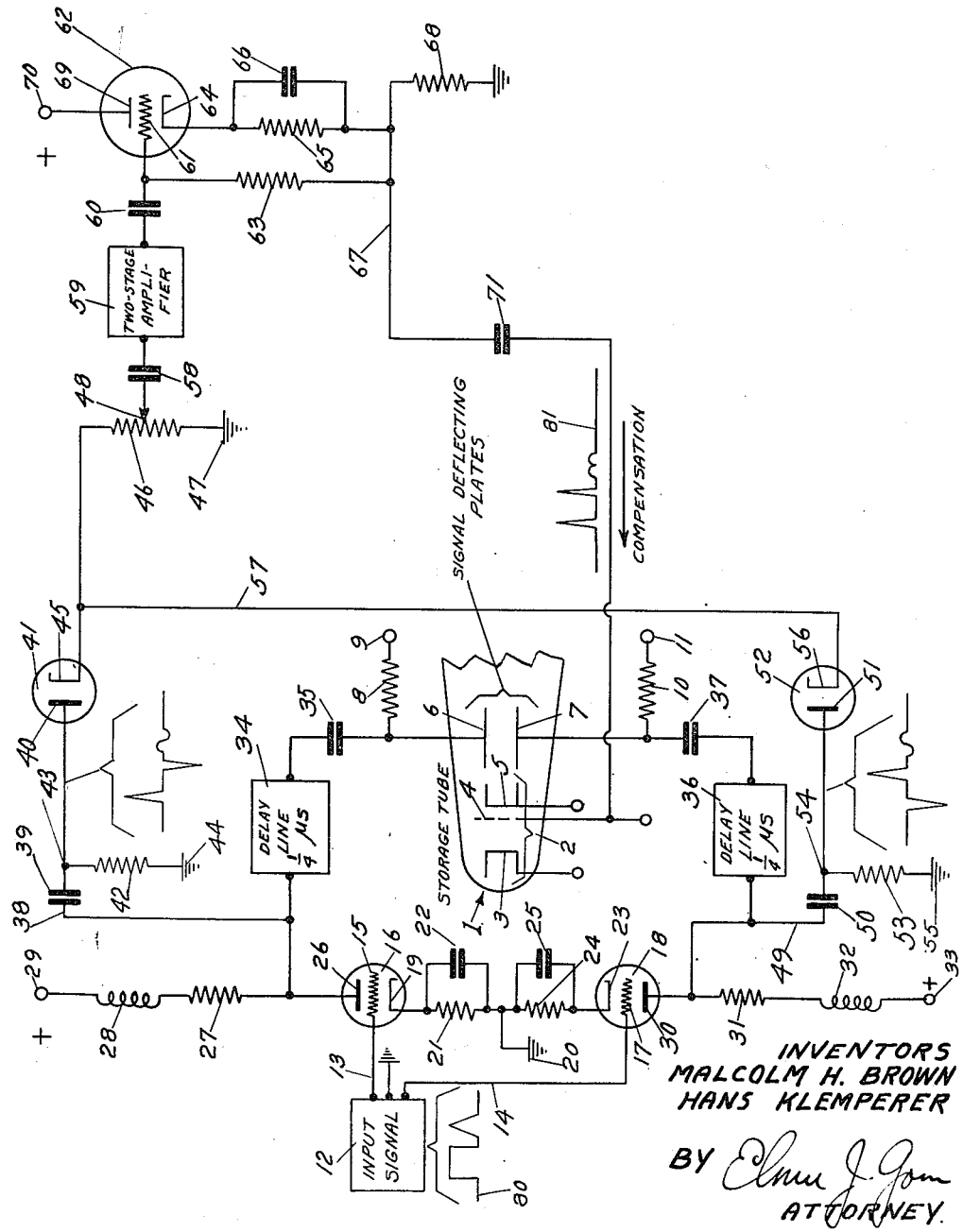

2,700,741

BEAM INTENSIFIER CIRCUIT

Malcolm H. Brown, Hudson, and Hans Klemperer, Belmont, Mass., assignors to Raytheon Manufacturing Company, Newton, Mass., a corporation of Delaware Application November 28, 1947, Serial No. 788,516

8 Claims. (Cl. 315—22)

This invention relates to electrical circuits and more particularly to a beam intensifier circuit for use in the input connection to a signal-responsive deflected-modulated cathode-ray tube of the storage type.

In tubes of the aforesaid type, an electron beam is projected to impinge substantially perpendicularly upon a planar storage plate made of insulating or electrically non-conductive material, such as glass. This beam is caused to trace a two-dimensional pattern over the storage plate by suitable voltages applied to two pairs of orthogonally-related deflecting plates. For example, a time sweep voltage may be applied to one pair of deflecting plates to deflect the beam horizontally, while a signal, such as that from a radar receiver, may be applied to the other pair of plates to deflect the beam vertically.

As disclosed in the copending application of H. Klemperer, Ser. No. 787,873, filed November 25, 1947, an electron beam impinging on a storage plate of the above character may be caused to produce on the storage plate a line of discrete charges of a predetermined potential, or a trace of a predetermined potential, along the path of travel of the beam over the surface of the plate, the potential of all the points along the trace being different from the potential of the points on the plate surface which remain untouched or unbombarded by the electron beam.

In a storage tube of the aforesaid type which is adapted to be used in a radar system, a signal such as a radar echo is stored in the form of an electrical charge distribution or trace on the surface of the storage plate, in the manner described in the preceding paragraph. In moving target indicator (MTI) applications, an individual complete trace over the storage surface is compared with the next succeeding trace, and any variations of potential of the storage surface encountered by the electron beam during the tracing of the second trace cause an output voltage to be produced. Any deviations in space configuration of the second trace as compared to the first trace are the result of movement of the radar targets, and these are the indications that are desired.

Therefore, it is highlyl desirable, for these applications of the storage tube, that each and every point along each trace be brought to the same potential as every other point on said trace, or, in other words, each trace should be a line of uniform predetermined potential on the storage plate. If this were not true, that is, if there were variations of potential along a single trace from one point to another on said trace, variations of potential would be encountered by the electron beam during the tracing of the second trace even though said second trace had exactly the same space configuration as the first trace, thus producing an output voltage which was not due to deviations in space configuration of the second trace resulting from the movement of radar targets but which would be interpreted as the result of target movement; such an output voltage is misleading and is undesirable.

In order to produce an equilibrium potential throughout the area of the storage plate bombarded by the electron beam, with a given beam velocity or beam current, it is necessary to not exceed a certain maximum beam sweep speed or beam writing speed across the storage plate surface, since the total number of electrons impinging on the storage plate surface, and therefore the attainment of the predetermined uniform equilibrium potential throughout each trace, depends on both the beam current and the beam writing speed. Now, as long as no objects are within the field of search of the radar equipment, so that no echoes are received, the electron beam is made to travel horizontally across the storage plate at a speed not exceeding the maximum beam writing speed and a desirable trace of uniform potential is produced on the storage plate. However, if any targets (either fixed or moving) are present in the field of search of the radar equipment, the electron beam is deflected in the vertical direction across the surface of the storage plate. During such deflections, while the direction of travel of the electron beam has a vertical component, the writing speed of the beam across the surface of the storage plate is not constant, and in fact exceeds the aforesaid permissible or allowable maximum beam writing speed, since the beam is traveling at said maximum speed while it has only a horizontal and not a vertical component of travel. As a result of this excessive rate of travel of the electron beam, equilibrium potential conditions are not reached during the parts of the trace in which the beam has a vertical component of travel, which parts are ordinarily at the leading and finishing or trailing edges of the vertical beam deflections representing targets. In other words, there is a variation of potential along a single trace, the portions thereof at the leading and trailing edges of the target deflections having a different potential from the remainder of the same trace.

As a result, therefore, of this variation in beam writing speed, erroneous or misleading signals or "spikes" appear in the output voltage of the storage tube, because of the operation of the tube in the manner described previously.

Therefore, an object of the present invention is to substantially eliminate misleading or erroneous output signals from the storage tube of an MTI radar system.

Another object is to compensate for variations of beam writing speed in an electron-beam-type storage tube.

A further object is to provide a beam intensifier circuit for an electron-beam-type discharge tube.

A still further object is to devise a beam intensifier circuit for a deflection-type electron-beam storage tube which automatically varies the beam intensity, as a function of the speed of deflection of the electron beam in a predetermined direction.

An additional object is to devise a beam intensifier circuit for a deflection-type electron-beam storage tube which automatically increases the beam intensity in direct proportion to the speed of deflection of the electron beam in a predetermined direction.

The foregoing and other objects of the invention will be best understood from the following description of an exemplification thereof, reference being had to the accompanying drawing, wherein the single figure is a circuit diagram of an embodiment of the present invention.

As stated previously, the total number of electrons impinging upon each element of the storage plate surface, and therefore also the attainment of a uniform predetermined potential throughout each trace, depends on and varies directly with both the electron beam current or beam intensity and the beam writing speed or speed of travel of said beam across said surface. In order to compensate for variations in speed of travel of the electron beam across the storage surface, and particularly to compensate for increases in such speed, it is therefore possible to vary the beam current or beam intensity as a direct function of the beam writing speed, and particularly to increase the beam current or beam intensity when the beam writing speed increases from zero in a particular predetermined direction. The present invention functions to apply a voltage to intensify the electron beam, the magnitude of which voltage depends upon the rate of change of deflection of the beam in the signal-responsive direction, or upon the instantaneous deflection speed or the instantaneous writing speed of the beam in the signal-responsive direction.

Referring now to the drawing, a storage tube 1 is the tube the electron beam of which is to be controlled in accordance with the present invention, and to which the received pulses indicative of targets in the field of search of a pulse-echo radar equipment are applied. An electron gun 2 is mounted at one end of the envelope of tube 1. This gun is shown, for purposes of simplicity, as consisting of an electron-emissive cathode 3, a control grid 4, and an accelerating anode 5. It should be understood, however, that other electrodes, such as focusing electrodes, may be provided in gun 2, in accordance with principles familiar to those skilled in the art of beam-projection-type electron discharge devices. Electrodes 3, 4 and 5 are connected, by means of suitable terminals indicated by circles, to suitable fixed voltage sources (not shown) in a manner familiar to those skilled in the art, to project an electron beam toward the right from cathode 3, said beam having a predetermined intensity or predetermined beam current which may be varied by the intermittent application of a suitable voltage to control grid 4, a positive grid voltage increasing the intensity of the electron beam and a negative voltage decreasing the intensity of said beam.

Mounted inside tube 1 is a pair of spaced horizontally-disposed electrostatic deflecting plates 6 and 7, for deflecting the electron beam from gun 2 vertically by the application of a suitable voltage between said plates. Upper plate 6 is connected through a resistor 8 to a terminal 9, while lower plate 7 is connected through a resistor 10 to a terminal 11; a centering direct voltage is applied across terminals 9 and 11 to center the beam exactly midway between plates 6 and 7 in the absence of any signal voltage applied to said plates.

Tube 1 is illustrated as broken off to the right of plates 6 and 7; however, it is to be understood that such a tube ordinarily contains a pair of vertically-disposed deflecting plates as well as a storage plate and the electrodes associated therewith, in accordance with the disclosure in the copending Klemperer application above referred to.

An input signal source 12, such as the receiver of a pulse-echo radar system, has a pair of output leads 13 and 14, between which a voltage appears in response to the presence of targets or objects within the field of search of the object-detecting radar system. Lead 13 is connected to grid 15 of an electron discharge tube 16, while lead 14 is connected to grid 17 of an electron discharge tube 18. Although tubes 16 and 18 are shown as triodes, it is to be understood that this is done only in order to simplify the drawings, and that these tubes may be pentodes if desired. Cathode 19 of tube 16 is connected to ground 20 through a self-biasing network comprising a resistor 21 and a condenser 22 in parallel, while cathode 23 of tube 18 is connected to ground 20 through a self-biasing network comprising a resistor 24 and a condenser 25 in parallel. By the above-described connections, source 12 provides a push-pull input to tubes 16 and 18, so that the signals appearing in the outputs of these two tubes are 180° out of phase with respect to each other.

The anode 26 of tube 16 is connected through a resistor 27 and a choke 28 to the positive terminal 29 of a suitable source of direct voltage, while anode 30 of tube 18 is connected through a resistor 31 and a choke 32 to the positive terminal 33 of a suitable source of direct voltage.

In order to apply the full voltage of the signal source 12 between deflecting plates 6 and 7 in a push-pull fashion, anode 26 is connected, through a delay line 34 (the purpose of which will be later described) and a condenser 35, to plate 6, while anode 30 is connected, through a similar delay line 36 and a condenser 37, to plate 7. In this way, the voltage of signal source 12 is applied across deflecting plates 6 and 7 to deflect the electron beam from gun 2 vertically in accordance with the instantaneous voltage of source 12.

A branch lead 38 extends from anode 26 through a condenser 39 to the anode 40 of a diode rectifier 41, a resistor 42 being connected between a point 43, intermediate condenser 39 and anode 40, and ground 44. Cathode 45 of rectifier 41 is connected through a resistor 46 to ground at 47. Resistor 46 has a movable tap 48 thereon.

A branch lead 49 extends from anode 30 through a condenser 50 to the anode 51 of a diode rectifier 52, a resistor 53 being connected between a point 54, intermediate condenser 50 and anode 51, and ground 55. Cathode 56 of rectifier 52 is connected, by means of a lead 57, to cathode 45 and thereby also to the upper end of potentiometric resistor 46.

The capacitance of condenser 39 and the resistance of resistor 42 have such values that, taken together, these circuit components comprise a differentiating circuit, or a so-called "R-C peaker" or "sharpening circuit". The voltage output of such a circuit is a narrow pulse produced from an input voltage wave-form having a jump in it, and, if the resistance and capacitance have the proper values, such a circuit will produce an output wave which is the derivative of the input wave applied thereto, or is proportional to the time rate of change of the input wave. The resistance capacitance network 39, 42 may therefore be called a derivating network. Assuming a rectangular voltage wave is applied as the input of such a circuit, the output voltage wave will consist of a pair of short sharp pulses of opposite polarities, one coinciding in time with the leading edge of the rectangular wave and the other coinciding in time with the trailing edge of the rectangular wave. The amplitude or magnitude of the voltage output of such a circuit is proportional to the time rate of change of the voltage input. Because of the inclusion of the rectifier 41 in series with the differentiating circuit 39, 42, only the positive one, of the two output pulses resulting from the application of a rectangular voltage input, is passed from the differentiating circuit to the resistor 46.

Condenser 50 and resistor 53 have such values that the R–C network 50, 53 is also a derivating network or differentiating circuit; preferably, the resistance of resistor 53 is the same as that of resistor 42 and the capacitance of condenser 50 is the same as that of condenser 39. Since rectifier 52 is included in series with the differentiating circuit 50, 53, only the positive pulses appearing in the output of said circuit are passed from said circuit to the resistor 46.

It will be remembered, from the above description, that the voltages appearing at the outputs of tubes 16 and 18 are obtained from the same source, but are 180° out of phase with each other. In other words, when one is positive, the other is negative, and vice versa. It may be seen that the outputs of the two differentiating circuits are both applied, through the respective rectifiers, to a common resistor 46; therefore, the voltage across resistor 46 is the algebraic sum or resultant output voltage of the two separate differentiating-and-rectifying circuits. Now, if a rectangular voltage wave, or any other voltage wave which varies in one direction from an axis and then returns to that axis, is applied from source 12 to the tubes 16 and 18 and the corresponding differentiating circuits, and, if the leading and trailing edges of the wave are symmetrical, two pulses of opposite polarity with respect to each other are produced by circuit 39, 42, and two pulses of opposite polarity with respect to each other are produced by circuit 50, 53 at the same times as the first two pulses mentioned, each pulse of circuit 39, 42 being of opposite polarity with respect to the corresponding (in time) pulse of circuit 50, 53. Since only the positive pulses are passed through the corresponding rectifiers, and since the voltage outputs of the two circuits are summed across resistor 46, it should be seen that, for such an input wave, a pair of positive voltage pulses is provided across resistor 46, one corresponding in time to the leading edge of the input wave from source 12 and the other corresponding in time to the trailing edge of the input wave from source 12.

Tap 48 is connected, through a coupling condenser 58, to a two-stage amplifier 59, to connect a portion of the voltage appearing across resistor 46 as the input of said amplifier. Amplifier 59 is conventional, so is shown in block form.

The amplified voltage output of amplifier 59 is applied, through a coupling condenser 60, to the grid 61 of a triode 62, a leak resistor 63 being connected between grid 61 and cathode 64 of said tube in the usual manner. Cathode 64 is connected, through a self-biasing network consisting of a resistor 65 and a condenser 66 in parallel, to a lead 67, which is connected to ground through a resistor 68. Anode 69 of tube 62 is connected to the positive terminal 70 of a source of direct voltage.

The cathode lead 67 is connected, through a coupling condenser 71, to control grid 4 of the storage tube, in order to apply voltage variations appearing in the output circuit of the tube 62 to said control grid.

The magnitudes of the voltage outputs of the two differentiating circuits depend upon the rate of change or slope of the voltage wave applied thereto from the source 12, and in fact vary directly with such slope. Since the output of source 12 is the voltage which is applied to the deflecting plates 6 and 7 to deflect the storage tube electron beam vertically, the output voltage of the differentiating circuits have magnitudes which depend upon and vary directly with the rate of change of deflection of the electron beam in the signal-responsive direction, or upon the instantaneous deflection speed or writing speed of the beam in a vertical direction. The voltage wave or voltage impulses which appear across resistor 46 and which, as described above, are in the positive direction with respect to ground, are amplified by amplifier 59 and are applied to control grid 4 of the storage tube 1. Because of the fact that the amplifier 59 has an even number of stages, for example, two stages, the output voltage of amplifier 59 is in phase with the input voltage thereof, so that positive impulses are applied to the tube 62. The tube 62 is connected as a cathode-follower amplifier stage, in which the output is taken from across the cathode resistor 68. The output voltage of a cathode-follower stage is in phase with the input voltage, so that positive impulses appear in the output lead 67 of the stage, these impulses corresponding to changes in the storage tube input signal voltage from source 12 and having magnitudes or peak amplitudes which vary directly with the time rate of change of the storage tube input voltage.

The wave 80 represents, with respect to ground, a typical series of impulses or a voltage wave which might appear in the output of signal source 12 to be applied to deflecting plates 6 and 7, this wave consisting of a positive rectangular impulse followed by a positive triangular impulse. Wave 81 represents, with respect to ground, a compensating voltage wave which is applied to grid 4 in response to the application of voltage 80 to the two differentiating and rectifying circuits and to the amplifying channel. Wave 81 has two steep positive peaks of rather high peak amplitude, one corresponding to the leading and one to the trailing edge of the rectangular impulse, these two peaked impulses being of high amplitude and short duration because of the high rate of change of the rectangular input impulse; these two positive impulses are produced one at the leading and one at the trailing edge of the rectangular wave by the action of the two separate differentiating-and-rectifying circuits in the manner explained previously. These two positive voltage impulses applied to control grid 4 cause the electron beam current of the storage tube to increase, or cause intensification of the beam, simultaneously with the application of such impulses to said grid, the degree of intensification being proportional to the amplitude of the compensating voltage or to the rate of change of the input voltage.

The triangular input impulse of wave 80, which follows in time the rectangular impulse, has a smaller time rate of change than does the rectangular impulse and, moreover, this rate of change or the slope of the voltage wave does not go to zero during the impulse, except instantaneously at the apex of the triangle. The derivative voltage applied to grid 4 (see wave 81) which is compensatory for this triangular input impulse therefore consists of a pair of positive impulses having a much smaller peak amplitude than the derivative impulses compensatory for the rectangular input impulse, the two impulses of this later pair being immediately adjacent to each other in time. These two later positive voltage impulses applied to control grid 4 will cause the electron beam current of the storage tube to increase, or cause intensification of the beam, simultaneously with the application of such impulses to said grid, the degree of intensification being proportional to the amplitude of the compensatory voltage or to the rate of change of the input voltage. The rate of change of the input signal voltage is also the writing speed of the electron beam in a vertical direction on the storage plate surface of the storage tube, and is also the speed of deflection of the electron beam in a vertical direction, since the input signal voltage is applied to the deflecting plates 6 and 7 to deflect the electron beam in a vertical direction.

Due to delay inherent in the circuit elements and tubes of the differentiating-and-rectifying circuits and of the amplifying circuit in the intensifying or grid voltage channel, the intensification or compensating voltage would lag the beam trace deflection voltage applied to the plates 6 and 7. This inherent delay is in effect compensated for by inserting the delay lines 34 and 36 in the deflection or trace voltage channels. As a result of the insertion of these delay lines, which give a delay of one-fourth microsecond, for example, a positive compensating voltage is applied to control grid 4 at substantially the same instant that the particular corresponding change in magnitude of the deflection voltage with respect to zero voltage, for which compensation is required, appears at the deflecting plates 6 and 7.

Although the diodes 41 and 52 are so poled as to pass therethrough pulses or voltages which are positive with respect to ground, it is within the scope of this invention to reversely pole these diodes, so as to pass therethrough voltages which are negative with respect to ground. If this is done, the upper end of resistor 46 will go negative with respect to ground. In this situation, in order to produce the proper effect on the electron beam in the storage tube, the amplifier 59 should consist of an odd number of stages, to reverse the polarity of the output voltage of said amplifier as compared to that of its input and to apply a positive voltage to control grid 4 of the storage tube. Alternatively, instead of making the amplifier 59 have an odd number of stages, it could be left with an even number, such as two, for example, and the beam intensification voltage could be applied to the storage tube cathode 3 rather than to the control grid 4. Under these conditions, a negative voltage would be applied to cathode 3. However, this negative voltage applied to the cathode causes the cathode to go more negative with respect to the grid, being equivalent to making the grid go more positive with respect to the cathode and increasing the intensity of the electron beam.

It may be seen, from the above, that there has been devised a means for compensating for variations of beam writing speed in an electron-beam type tube, the beam intensifier circuit automatically varying the beam intensity as a function of the speed of deflection of the beam in a predetermined direction, the beam intensity being varied in direct proportion to the speed of deflection of the electron beam in the aforesaid predetermined direction. As a result, when the herein-described circuit is used with a storage tube in an MTI radar system, misleading or erroneous output signals, which would naturally tend to arise from variations in the writing speed of the electron beam, are substantially eliminated.

Of course, it is to be understood that this invention is not limited to the particular details as described above, as many equivalents will suggest themselves to those skilled in the art. For example, although this invention has been described in connection with a storage tube and in connection with a radar system, it is desired to be made clear that the applicants' circuit arrangement may be utilized with any cathode-ray or electron-beam tube in which, for any purpose, it is desirable to automatically vary the intensity of the electron beam to compensate for factors which would ordinarily tend to cause the beam intensity to vary from a predetermined value. Various other variations will suggest themselves. It is accordingly desired that the appended claims be given a broad interpretation commensurate with the scope of this invention within the art.

What is claimed is:

1. The method of compensating for variations in speed of travel of a signal-voltage-deflected electron beam, which consists in projecting an electron beam, applying a signal voltage to said beam to deflect the same, differentiating said signal voltage, applying a portion of the differentiated voltage to said beam to vary the intensity of the same in accordance with the rate of change of magnitude of said signal voltage, and delaying the application of said signal voltage to said beam for a time equal to the time delay inherent in the differentiation of said signal voltage and in the application of the differentiated voltage to said beam.

2. A beam-intensifier circuit for a cathode ray tube, comprising means for projecting an electron beam, means for applying a signal voltage to said beam to deflect the same, means for differentiating said signal voltage, and means for applying a portion of the differentiated voltage to said beam to vary the intensity of the same in accordance with the rate of change of magnitude of said signal voltage, said differentiating means and said last-named applying means inherently producing a time delay in the application of said differentiated voltage to said beam, said first-named applying means including means for delaying the application of said signal voltage to said beam for a time equal to said inherent time delay.

3. A beam-intensifier circuit for a cathode ray tube, comprising means for projecting an electron beam, means for applying a signal voltage to said beam to deflect the same comprising a pair of deflection plates fed by a push-pull amplifying system through a pair of delay networks, means for differentiating said signal voltage, and means for applying a portion of the differentiated voltage to said beam to intensify the same in accordance with a function of the magnitude of said signal voltage from a zero value.

4. A beam-intensifier circuit for a cathode ray tube, comprising means for projecting an electron beam, means for applying a signal voltage to said beam to deflect the same, means for differentiating said signal voltage, and means for applying a portion of the differentiated voltage to said beam to intensify the same in direct proportion to the time rate of change of said signal voltage, and means for delaying the position of said signal voltage applied to said beam deflection means.

5. A beam-intensifier circuit for a cathode ray tube, comprising means for projecting an electron beam, means for applying a signal voltage to said beam to deflect the same, means for differentiating said signal voltage, and means for applying a portion of the differentiated voltage to said beam to intensify the same in direct proportion to the time rate of change of said signal voltage, said differentating means and said last-named applying means inherently producing a time delay in the application of said differentiated voltage to said beam, said first-named applying means including means for delaying the application of said signal voltage to said beam for a time equal to said inherent time delay.

6. A beam-intensifier circuit for a cathode ray tube comprising: a cathode ray tube including means for projecting an electron beam and a control electrode for varying the intensity of said beam; means for applying a portion of a signal voltage to said beam to deflect the same; means for differentiating said signal voltage; means for applying the differentiated voltage to said electrode to vary the intensity of said beam as a function of the magnitude of said signal voltage; said differentiating means and said last-named applying means inherently producing a time delay in the application of said differentiated voltage to said electrode; said first-named applying means including means for delaying the application of said signal voltage to said beam for a time equal to said inherent time delay.

7. A beam-intensifier circuit for a cathode ray tube, comprising means for projecting an electron beam, means for applying a signal voltage to said beam to deflect the same, means for differentiating said signal voltage, means for rectifying the differentiated voltage, and means for applying the rectified differentiated voltage to said beam to vary the intensity of the same as a function of the magnitude of said signal voltage, said differentiating means, said rectifying means and said last-named applying means inherently producing a time delay in the application of said rectified differentiated voltage to said beam, said first-named applying means including means for delaying the application of said signal voltage to said beam for a time equal to said inherent time delay.

8. A beam-intensifier circuit for a cathode ray tube comprising: a cathode ray tube including means for projecting an electron beam, a control electrode for varying the intensity of said beam, and deflecting electrodes for said beam; a source of signal voltage; means connecting said source to said deflecting electrodes to deflect said beam in response to said signal voltage; a pair of differentiating circuits connected to opposite sides of said source for differentiating said signal voltage and for producing in the output of one or the other of said cricuits a voltage positive with respect to ground irrespective of the direction of change of said signal voltage; separate means for rectifying the outputs of each of said circuits in such a way as to produce in the outputs of each of said rectifying means voltage waves having only positive polarities with respect to ground; means for combining the outputs of each of said rectifying means and for applying the combined output to said control electrode to vary the intensity of said beam in accordance with changes in magnitude of said signal voltage; said differentiating circuits, said rectifying means and said last-named means inherently producing a time delay in the application of said combined output to said control electrode; said connecting means including means for delaying the application of said signal voltage to said deflecting electrodes for a time equal to said inherent time delay.

References Cited in the file of this patent

UNITED STATES PATENTS

| | | |
|---|---|---|
| 2,313,967 | Read | Mar. 16, 1943 |
| 2,375,709 | Thompson | May 8, 1945 |
| 2,418,133 | Miller | Apr. 1, 1947 |
| 2,431,766 | Miller et al. | Dec. 2, 1947 |
| 2,453,711 | Isbister et al. | Nov. 16, 1948 |